(12) United States Patent
Wang et al.

(10) Patent No.: US 7,440,652 B2
(45) Date of Patent: Oct. 21, 2008

(54) WAVELENGTH DIVISION MULTIPLEXED COUPLER

(75) Inventors: Zeqin Wang, Shenzhen (CN); Bin Chen, Shenzhen (CN); Yi Li, Shenzhen (CN)

(73) Assignee: O-Net Communication (SZ) Ltd., Nanshan District, Shenzhen (CN)

( * ) Notice: Subject to any disclaimer, the term of this patent is extended or adjusted under 35 U.S.C. 154(b) by 0 days.

(21) Appl. No.: 10/863,695

(22) Filed: Jun. 8, 2004

(65) Prior Publication Data

US 2005/0008292 A1    Jan. 13, 2005

(30) Foreign Application Priority Data

Jul. 10, 2003    (CN) .............................. 03 2 67395 U

(51) Int. Cl.
G02B 6/32    (2006.01)
G02B 6/26    (2006.01)
G02B 6/42    (2006.01)

(52) U.S. Cl. .............................. 385/34; 385/33; 385/51; 385/91; 385/95

(58) Field of Classification Search ............. 385/33–34, 385/51
See application file for complete search history.

(56) References Cited

U.S. PATENT DOCUMENTS

| | | | | |
|---|---|---|---|---|
| 5,796,889 A * | 8/1998 | Xu et al. ........................ | 385/24 |
| 6,040,944 A * | 3/2000 | Pan et al. ..................... | 359/590 |
| 6,084,994 A * | 7/2000 | Li et al. ......................... | 385/31 |
| 6,168,319 B1 * | 1/2001 | Francis ......................... | 385/79 |
| 6,282,339 B1 * | 8/2001 | Zheng .......................... | 385/34 |
| 6,385,372 B1 * | 5/2002 | Yang ............................ | 385/43 |
| 6,454,465 B1 * | 9/2002 | Uschitsky et al. ............. | 385/79 |
| 6,597,837 B2 * | 7/2003 | Xiaofan ....................... | 385/33 |
| 6,714,703 B2 * | 3/2004 | Lee et al. ...................... | 385/34 |
| 6,876,789 B2 * | 4/2005 | Kagami et al. ................ | 385/31 |
| 6,907,163 B2 * | 6/2005 | Lewis .......................... | 385/33 |
| 2003/0012517 A1 * | 1/2003 | Yu et al. ....................... | 385/73 |
| 2003/0099453 A1 * | 5/2003 | Moidu et al. ................ | 385/138 |
| 2004/0001713 A1 * | 1/2004 | Ting et al. .................... | 398/48 |

* cited by examiner

Primary Examiner—Frank G Font
Assistant Examiner—Erin D Chiem
(74) Attorney, Agent, or Firm—Morris Manning Martin LLP; Tim Tingkang Xia, Esq.

(57) ABSTRACT

A WDM coupler includes a first collimator including a single fiber pigtail, a first GRIN lens and a first glass holding tube; a second collimator including a dual fiber pigtail, a second GRIN lens and a second glass holding tube; an optical filter arranged on an end surface of the second GRIN lens of the second collimator; an outer glass sleeve bridging the first and second collimators; and UV-curing epoxy between the outer glass sleeve and the glass holding tubes of the first and second collimators for securing the first and second collimators to the outer glass sleeve. The expansion coefficient of the UV-curing epoxy is matched to that of the glass materials of the outer glass sleeve and the first and second holding tubes, so that the first and second collimators can directly be fixed in the outer glass sleeve using the UV-curing epoxy.

10 Claims, 3 Drawing Sheets

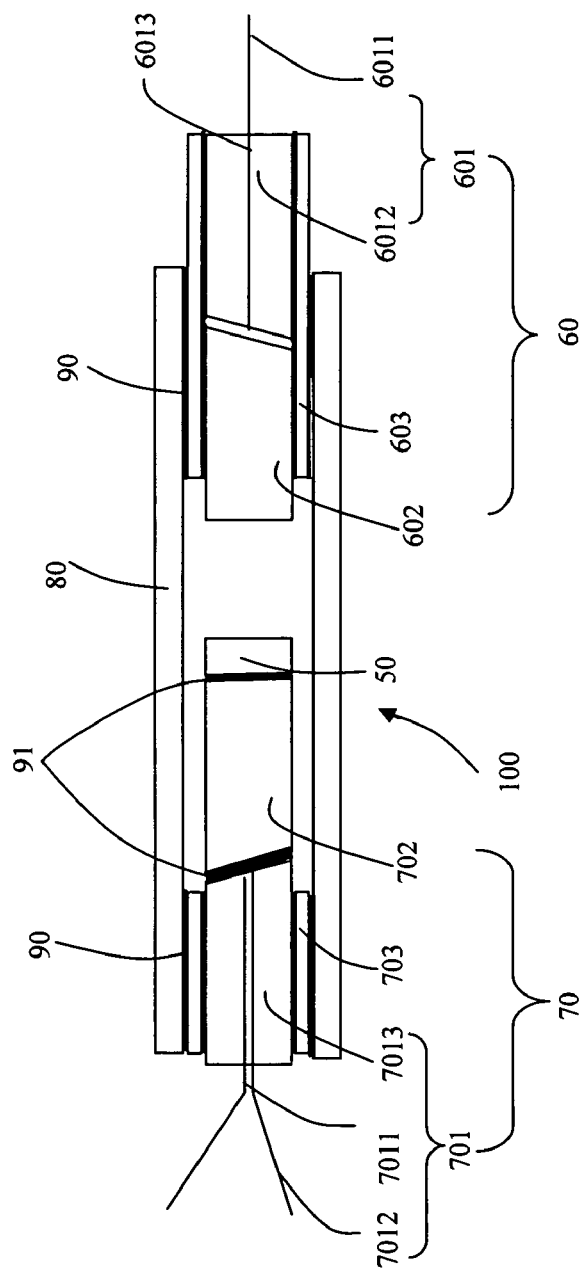
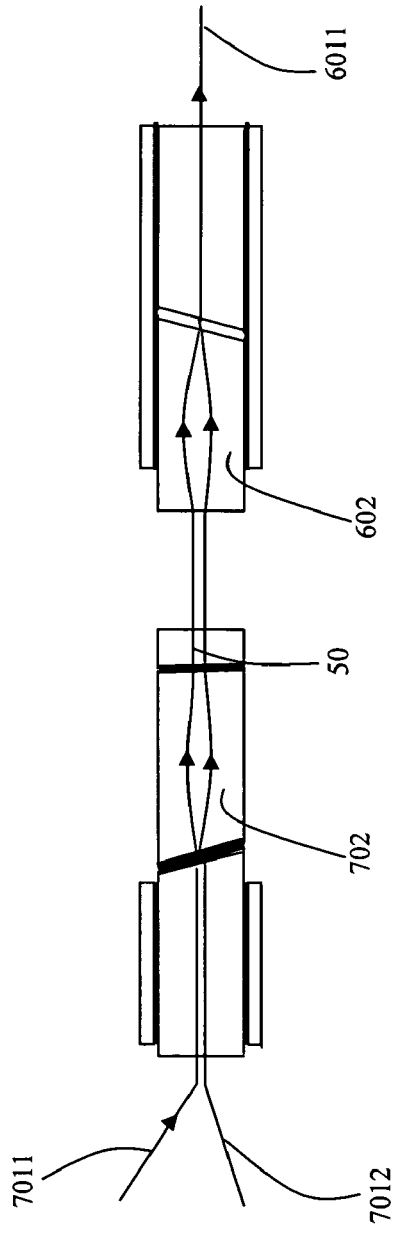
FIG. 3(a)
FIG. 3(b)

US 7,440,652 B2

WAVELENGTH DIVISION MULTIPLEXED COUPLER

CROSS REFERENCE TO RELATED APPLICATION

The present application claims priority from Chinese Patent Application No. 03267395.7, filed Jul. 10, 2003.

BACKGROUND OF THE INVENTION

1. Field of the Invention

The present invention relates to an optical component, and more particularly to a wavelength division multiplexed (WDM) coupler.

2. Description of the Prior Art

In optical fiber technology, wavelength division multiplexed (WDM) couplers are used to combine or separate optical signals with different wavelengths. As the WDM couplers are being more broadly applied in the telecommunications, data communications and CATV industries, the fiber optic component industry is now confronted with increasing requirements for WDM couplers with high performance and reliability.

FIGS. 1(a) and 1(b) respectively show the optical paths of a WDM coupler. Referring to FIG 1(a), light beams with wavelengths $\lambda_1$, $\lambda_2$ are transmitted through an optical fiber 1 of an optical ferrule 3, and are transmitted to a GRIN lens 4, parallel light beams are passed from the GRIN lens 4 through an optical filter 5, and the reflective light beams with wavelength $\lambda_2$ are reflected by the optical filter 5 and are transmitted back through the GRIN lens 4 and are coupled into an optical fiber 2. Light beams with wavelength $\lambda_1$ are transmitted through the optical filter 5, and transmitted to a GRIN lens 6 and coupled into an optical fiber 8 of an optical ferrule 7. Referring to FIG. 1(b), since light beams can be reversed, if light beams with wavelength $\lambda_2$ are emitted from the optical fiber 2, and light beams with wavelength $\lambda_1$ are emitted from the optical fiber 8, the optical fiber 1 will attain light beams having light beams having wavelengths $\lambda_1$, $\lambda_2$.

FIG. 2 shows the structure of a typical WDM coupler fabricated according to packaging technologies based on epoxy bonding or welding. The WDM coupler includes:

(1) a first collimator 10 including a dual fiber pigtail 101, a GRIN lens 102 and a glass tube 104; the dual fiber pigtail 101 being retained in the glass tube 104, and the GRIN lens 102 being adhered to an end surface of the dual fiber pigtail 101 using heat-curing epoxy (not labeled);

(2) an optical filter 103 attached to the GRIN lens 102 using heat-curing epoxy (not labeled);

(3) a first sleeve 106 coated with gold and retaining the first collimator 10;

(4) a second collimator 20 including a single fiber pigtail 201, a GRIN lens 202 and a glass tube 203, the single fiber pigtail 201 and the GRIN lens 202 being retained in the glass tube 203;

(5) a second sleeve 206 coated with gold and enclosing the second collimator 20; and (6) an outer sleeve 30; the first and second collimators 10, 20 are respectively soldered in the outer sleeve 30 through apertures 40.

This WDM coupler has good performance and stability based on soldering technologies. Soldering process must be performed at high temperature, which will causes stresses in the components. To release the stresses must take hours, which lead to long manufacturing procedure. In addition, there is a temperature stability issue. Thus, performance and reliability of the WDM coupler are limited by the above-mentioned difficulties.

Therefore, it is desired to provide a WDM coupler which has excellent stability and low manufacturing cost.

SUMMARY OF THE INVENTION

Accordingly, an object of the present invention is to provide a WDM coupler which has excellent stability and low manufacturing cost and to provide a method for making same.

To achieve the above object, the WDM coupler in accordance with the present comprises:

a first collimator comprising a single fiber pigtail, a first GRIN lens and a first holding tube, the first GRIN lens and the single fiber pigtail being retained in the first holding tube;

a second collimator comprising a dual fiber pigtail, a second GRIN lens and a second holding tube, the second GRIN lens being arranged on an end surface of the dual fiber pigtail, and the dual fiber pigtail being retained in the second holding tube;

an optical filter arranged on an end surface of the second GRIN lens of the second collimator;

an outer glass sleeve bridging the first and second collimators; and

UV-curing epoxy between the outer glass sleeve and the holding tubes of the first and second collimators for securing the first and second collimators to the outer glass sleeve.

Other objects, advantages and novel features of the present invention will become more apparent from the following detailed descriptions when taken in conjunction with the accompanying drawings, in which:

BRIEF DESCRIPTION OF THE DRAWINGS

FIG. 3(a) is a cross-sectional view of a WDM coupler in accordance with the present invention; and FIG. 3(b) is a schematic cross-sectional view of optical paths of the WDM coupler of FIG. 3(a).

DETAILED DESCRIPTION OF THE INVENTION

Figure 1A:
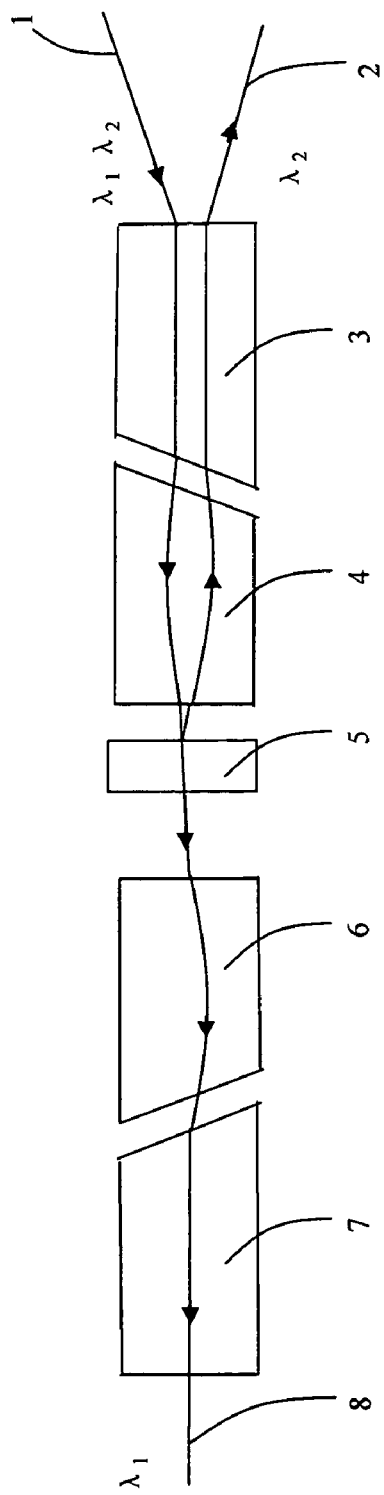
FIG. 1(a) is a schematic cross-sectional view of optical paths of a WDM coupler.
Figure 1B:
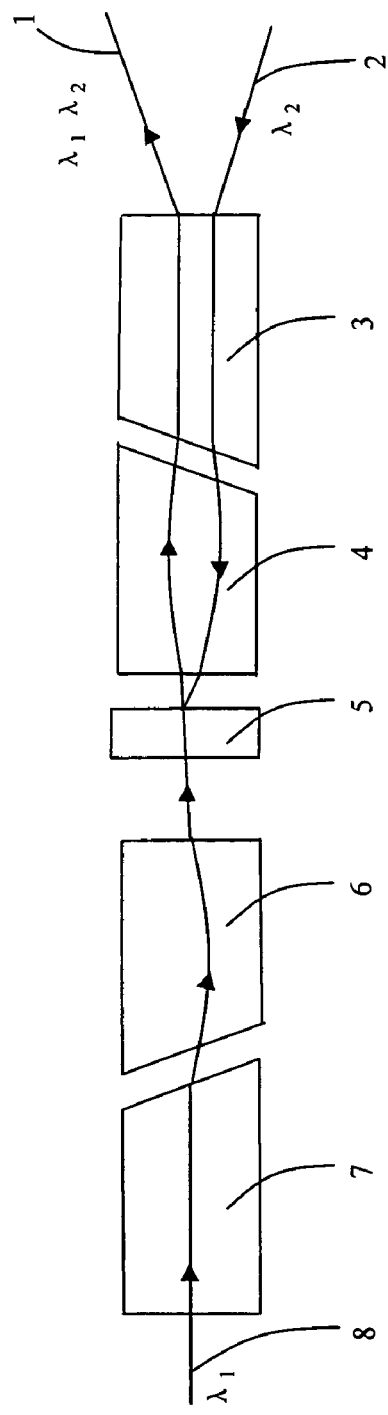
FIG. 1(b) is another schematic cross-sectional view of optical paths of a WDM coupler.
Figure 2:
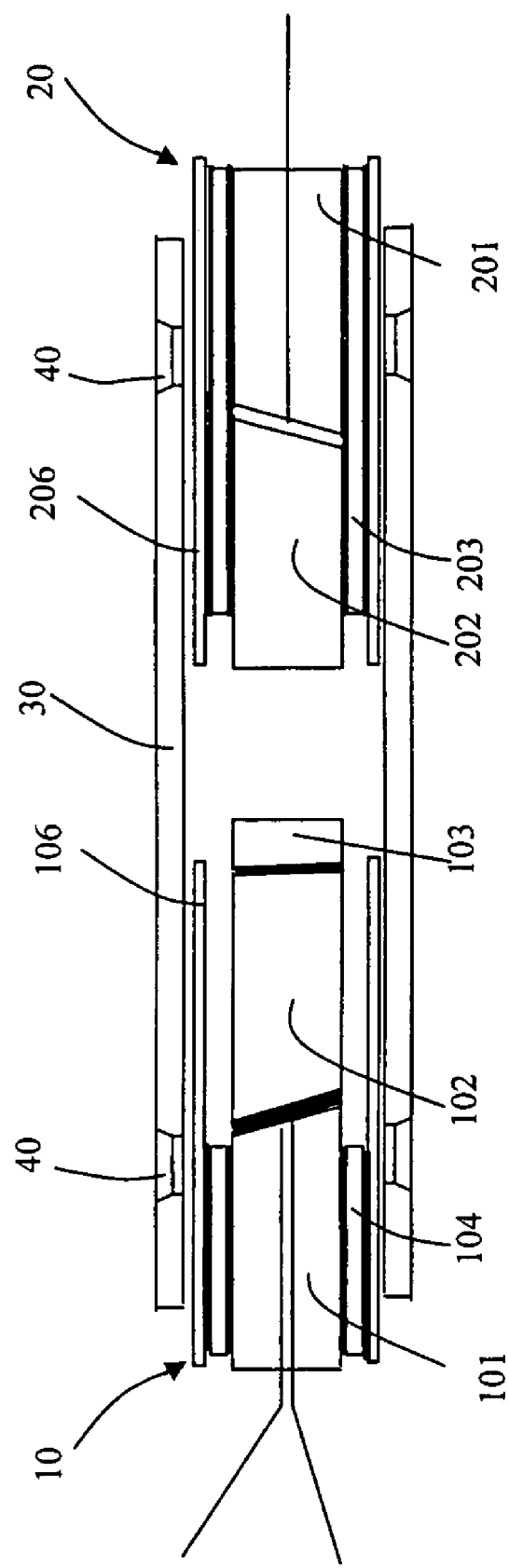
FIG. 2 is a cross-sectional view of a conventional WDM coupler.

Referring to FIG. 3(a), the WDM coupler 100 of the present invention comprises an optical filter 50, a first collimator 60, a second collimator 70 and an outer glass sleeve 80. The optical filter 50 is adhered to a forward end surface of the second collimator 70 using UV-curing epoxy 91 away from an optical path of the WDM coupler 100. The first collimator 60 is partially enclosed in the rear portion of the outer glass sleeve 80 using UV-curing epoxy 90, and the second collimator 70 is retained in the forward portion of the outer glass sleeve 80 using UV-curing epoxy 90.

The first collimator 60 includes a single fiber pigtail 601, a first GRIN lens 602 and a first holding tube 603. The single fiber pigtail 601 is totally fixed in the first holding tube 603.

The first GRIN lens 602 is arranged on rear of the single fiber pigtail 601 and partially fixed in the first holding tube 603. The single fiber pigtail 601 includes an optical fiber 6011 and a ferrule 6012. The optical fiber 6011 is snugly retained in a pore 6013 of the ferrule 6012. The diameter of the first GRIN lens 602 is the same as that of the ferrule 6012. The first holding tube 603 is generally made of glass material.

The second collimator 70 includes a dual fiber pigtail 701, a second GRIN lens 702 and a second holding tube 703. The dual fiber pigtail 701 is retained in the second holding tube 703, and includes two optical fibers 7011, 7012 and a ferrule 7013. The optical fibers 7011, 7012 are retained in the ferrule 7013. The second GRIN lens 702 is adhered to the fore end surface of the ferrule 7013 using UV-curing epoxy 91. The second holding tube 703 is generally made of glass material.

The optical filter 50 is for passing through light beams having a predetermined wavelength and reflecting light beams not having the predetermined wavelength. The outer glass sleeve 80 is for bridging the first and the second collimators 60, 70.

To assemble the first collimator 60, the first GRIN lens 602 is firstly inserted and fixed in the holding tube 603 via an epoxy (not labeled). The single fiber pigtail 601 is then inserted into the first holding tube 603 and aligned with the first GRIN lens 602. After achieving the lowest transmission loss between the first GRIN lens 602 and the single fiber pigtail 601, the epoxy is cured, so that the first GRIN lens 602 and the single fiber pigtail 601 are firmly fixed in the first holding tube 603.

To assemble the second collimator 70, the optical filter 50 is firstly adhered to the fore end surface of the second GRIN lens 702 using the UV-curing epoxy 91 of high viscosity away from an optical path of the WDM coupler 100. The dual fiber pigtail 701 is then aligned with the second GRIN lens 702. After achieving the lowest reflection loss, the UV-curing epoxy 91 is applied between the dual fiber pigtail 701 and the second GRIN lens 702. The UV-curing epoxy 91 is cured by ultraviolet radiation thereby securing the second GRIN lens 702 to the dual fiber pigtail 701. Finally, the dual fiber pigtail 701 with the second GRIN lens 702 and the optical filter 50 is snugly fixed in the second holding tube 703 using UV-curing epoxy (not labeled).

To assemble the WDM coupler 100, the second collimator 70 is firstly fixed in the outer glass sleeve 80 using the UV-curing epoxy 90. The first collimator 60 is partially inserted into the outer glass sleeve 80 and aligned with the second collimator 70. After having the first and second collimators 60, 70 in perfect alignment, the UV-curing epoxy 90 is applied between the first collimator 60 and the outer glass sleeve 80. The UV-curing epoxy 90 is cured by ultraviolet radiation thereby securing the first collimator 60 to the outer glass sleeve 80.

The expansion coefficient of the UV-curing epoxy 90, 91 matches that of the glass materials of the outer glass sleeve 80 and the first and second holding tubes 603, 703. Preferably, the expansion coefficient of the UV-curing epoxy 90, 91 is the same as that of the glass materials of the outer glass sleeve 80 and the first and second holding tubes 603, 703.

Referring to FIG. 3(b), input light beams emitted from the optical fiber 7011 are transmitted through the second GRIN lens 702 in a forward direction. The second GRIN lens 702 transmits the input light beams in a forward direction as parallel light beams. Said parallel light beams are then split by the optical filter 50. Parallel light beams with a predetermined wavelength are transmitted in a forward direction through the optical filter 50. The parallel light beams passed through the optical filter 50 are transmitted in a forward direction through the first GRIN lens 602 and focused on an end of the optical fiber 6011, and are transmitted through the optical fiber 6011. Such parallel light beams as have other than the predetermined wavelength are reflected back to the second GRIN lens 702 and are transmitted through the second GRIN lens 702 as reflective light beams in a rearward direction, said reflective light beams are focused on an end of the optical fiber 7012 and are transmitted through the optical fiber 7012.

The expansion coefficient of the UV-curing epoxy 90 matches that of the glass materials of the outer glass sleeve 80 and the first and second holding tubes 603, 703, so that the first and second collimators 60, 70 can be directly fixed in the outer glass sleeve 80 using the UV-curing epoxy 90. Compared with the conventional WDM coupler, the first and second sleeves coated with gold and respectively enclosing the first and second collimators can be removed, so that the WDM coupler 100 of the present invention can be easily assembled and manufacturing cost can be reduced. In addition, the UV-curing epoxy 90 can be quickly cured by ultraviolet radiation, thereby reducing the assembly time and improving the stability of the WDM coupler 100.

It is understood that the present invention may be embodied in other forms without departing from the spirit thereof. Thus, the present examples and embodiments are to be considered in all respects as illustrative and not restrictive, and the invention is not to be limited to details given herein.

What is claimed is:

1. A wavelength division multiplexed coupler comprising:
   a first collimator comprising a single fiber pigtail, a first GRIN lens, and a first, one piece holding tube, the first GRIN lens and the single fiber pigtail being retained in the first holding tube;
   a second collimator comprising a dual fiber pigtail, a second GRIN lens, and a second, one piece holding tube, the second GRIN lens being arranged on an end surface of the dual fiber pigtail, and the dual fiber pigtail being retained in the second holding tube;
   an optical filter arranged on an end surface of the second GRIN lens of the second collimator;
   a one piece, outer glass sleeve bridging the first and second collimators, said outer glass sleeve being positioned radially outwardly from said holding tubes of said first and second collimators and surrounding said holding tubes of said first and second collimators along at least a portion of their lengths; and
   UV-curing epoxy between the outer glass sleeve and the holding tubes of the first and second collimators for securing the first and second collimators to the one piece, outer glass sleeve.

2. The wavelength division multiplexed coupler in accordance with claim 1, wherein the first and second holding tubes are made of glass material.

3. The wavelength division multiplexed coupler in accordance with claim 1, wherein the expansion coefficient of the UV-curing epoxy matches that of the glass material of the outer glass sleeve.

4. The wavelength division multiplexed coupler in accordance with claim 2, wherein the expansion coefficient of the UV-curing epoxy matches that of the glass material of the first and second holding tubes.

5. The wavelength division multiplexed coupler in accordance with claim 4, wherein the expansion coefficient of the UV-curing epoxy is preferably the same as that of the glass materials of the outer glass sleeve and the glass tubes of the first and second collimators.

6. The wavelength division multiplexed coupler in accordance with claim 1, wherein the optical filter is arranged on the end surface of the second GRIN lens with an epoxy of high viscosity to ensure that the optical-path is epoxy free.

7. The wavelength division multiplexed coupler in accordance with claim 1, wherein the second GRIN lens of the second collimator is arranged on the end surface of the dual pigtail of the second collimator with an epoxy.

8. The wavelength division multiplexed coupler in accordance with claim 1, wherein the single pigtail comprises an optical fiber and a ferrule, and the optical fiber is retained in a pore of the ferrule.

9. The wavelength division multiplexed coupler in accordance with claim 1, wherein the dual fiber pigtail comprises two optical fibers and a ferrule, and the optical fibers are retained in the ferrule.

10. The wavelength division multiplexed coupler in accordance with claim 1, wherein the second GRIN lens is not retained in a holding tube.

* * * * *